(12) United States Patent
McMurtry et al.

(10) Patent No.: US 7,346,993 B2
(45) Date of Patent: Mar. 25, 2008

(54) ROTARY SCALE

(75) Inventors: David Roberts McMurtry, Dursley (GB); James Reynolds Henshaw, Stroud (GB); Alexander David Scott Ellin, Horsley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/521,440

(22) PCT Filed: Jul. 16, 2003

(86) PCT No.: PCT/GB03/03101

§ 371 (c)(1),
(2), (4) Date: Jan. 14, 2005

(87) PCT Pub. No.: WO2004/008079

PCT Pub. Date: Jan. 22, 2004

(65) Prior Publication Data

US 2005/0235502 A1  Oct. 27, 2005

(30) Foreign Application Priority Data

Jul. 16, 2002  (GB) .................................. 0216487.9

(51) Int. Cl.
*G01D 21/00*  (2006.01)
(52) U.S. Cl. ............................ 33/1 PT; 33/1 N; 33/706
(58) Field of Classification Search ................... 33/1 N, 33/1 PT, 705–707, 703, 755, 758–759, 710, 33/776, 772, 514.1, 514.2
See application file for complete search history.

(56) References Cited

U.S. PATENT DOCUMENTS 4,332,087 A * 6/1982 Ellis ........................... 33/759
4,513,512 A * 4/1985 Fischer ........................ 33/471
4,926,566 A   5/1990 McMurtry et al.
4,974,962 A  12/1990 Stephens et al.
5,979,238 A * 11/1999 Boege et al. .................. 33/755
6,293,021 B1 * 9/2001 Freitag et al. .............. 33/1 PT
6,481,115 B1 * 11/2002 Henshaw et al. ............. 33/645
6,612,048 B2 * 9/2003 Peterlechner et al. ......... 33/755
6,637,118 B2 * 10/2003 Feichtinger ................ 33/1 PT
6,775,921 B2 * 8/2004 Spark et al. .................. 33/706
2004/0211072 A1 * 10/2004 Hertenberger et al. ...... 33/1 PT
2005/0229410 A1 * 10/2005 McMurtry et al. .......... 33/1 PT
2006/0168837 A1 * 8/2006 Muir ............................ 33/710

FOREIGN PATENT DOCUMENTS

DE   43 31 668 A1   3/1995
DE   196 11 983 C1   7/1997
DE   197 51 019 A1   6/1999

(Continued)

*Primary Examiner*—Yaritza Guadalupe-McCall
(74) *Attorney, Agent, or Firm*—Oliff & Berridge, PLC

(57) ABSTRACT

A rotary ring for use in scale reading apparatus, comprises a flexible ring (10) which has scale markings (14) provided on a surface thereof. The rotary ring is mounted onto a machine part (22) by providing the machine part with a region of increased diameter (26) and stretching or shrinking the flexible rotary scale (10) over said region of increased diameter. The manufacturing tolerance of the rotary scale or differential e.g. thermal expansion is thus taken up by stretching or shrinking it into place. The region of increased diameter may comprise an annular protrusion or an O-ring, for example.

21 Claims, 4 Drawing Sheets

FOREIGN PATENT DOCUMENTS

| | | |
|---|---|---|
| EP | 0 207 121 B1 | 1/1990 |
| EP | 1 094 302 A2 | 4/2001 |
| EP | 1 211 482 A1 | 6/2002 |
| JP | A-1-145423 | 6/1989 |
| JP | A-2-130418 | 5/1990 |
| JP | U-5-73524 | 10/1993 |
| JP | A-6-109414 | 4/1994 |
| JP | A-7-243870 | 9/1995 |
| JP | A-2000-153413 | 6/2000 |

* cited by examiner

ROTARY SCALE

The present invention relates to a rotary scale for use in metrological scale reading apparatus.

A known form of metrological scale reading apparatus for measuring relative displacement of two members comprises a scale on one of the members, having scale marks defining a pattern and a readhead on the other of the members. In an opto-electronic scale reading apparatus, the readhead includes a light source for illuminating the scale, periodic diffraction means for interacting with light reflected from the scale marks to produce interference fringes at the readhead. Relative movement of the scale and readhead cause the interference fringes to move relative to the readhead. Detecting means are responsive to the movement of the fringes and produce a measure of displacement. Another type of metrological scale reading apparatus comprises magnetic scale reading apparatus in which the scale comprises a magnetic grating and wherein pulse signals for each unit displacement of the readhead are used to determine a measurement value.

An example of such apparatus is disclosed in EP-A-0 207 121 and also U.S. Pat. No. 4,974,962, each of which shows the means for illuminating the scale and the periodic diffraction means in the read head. U.S. Pat. No. 4,926,566 discloses a method of producing a scale, in the form of a flexible tape produced by rolling. This method may produce a scale in which the pitch of the scale marks is, for example, 20 µm or 40 µm.

For measuring rotary displacement, a scale is held around a cylindrical surface which rotates in use with a shaft or other rotary part relative to a readhead. This apparatus is typically called a rotary encoder.

Our European Patent application 1094302 discloses a rotary encoder in which a ring is used to hold a length of scale in the form of metallic tape on an outer surface. The ring is fitted onto a rotary part of a machine. The inner circumferential surface of the ring and the rotary part of the machine onto which the ring is fitted are both tapered. This removes the need for close tolerances on the diameters of the ring and the rotary part. In addition it enables the adjustment of the centre of the ring.

According to a first aspect of the invention there is provided a rotary ring for use in scale reading apparatus, comprising:

a flexible ring, the flexible ring having scale markings provided on a surface thereof.

A second aspect of the present invention provides a system for mounting a rotary ring for use in scale reading apparatus onto a machine part, comprising a rotary ring for use in scale reading apparatus, the rotary ring including a flexible ring having scale markings provided on a surface thereof, and co-operating means on the machine part, the co-operating means comprising a region of increased diameter.

A third aspect of the present invention comprises a method of mounting a flexible rotary scale onto a part of a machine, said part having a region of increased diameter, the method comprising:

stretching or shrinking the flexible rotary scale over said region of increased diameter.

The manufacturing tolerance of the rotary scale or differential e.g. thermal expansion is thus taken up by stretching or shrinking it into place.

The region of increased diameter may be integral with the machine part, eg an annular protrusion, or may comprise a separate part, eg ring-shaped flexible member, such as an O-ring.

The region of increased diameter may comprise a tapered surface. In addition, or alternatively, the flexible rotary ring may be provided with a tapered surface. The tapered surface of the region of increased diameter and/or the rotary ring form a self locking taper.

The region of increased diameter may be shaped so that once the flexible rotary ring is fitted over said region of increased diameter, the central region of said rotary ring is substantially parallel with the axis of said machine part.

The present invention will now be described, by way of example, with reference to the accompanying drawing, in which.

Figure 1:
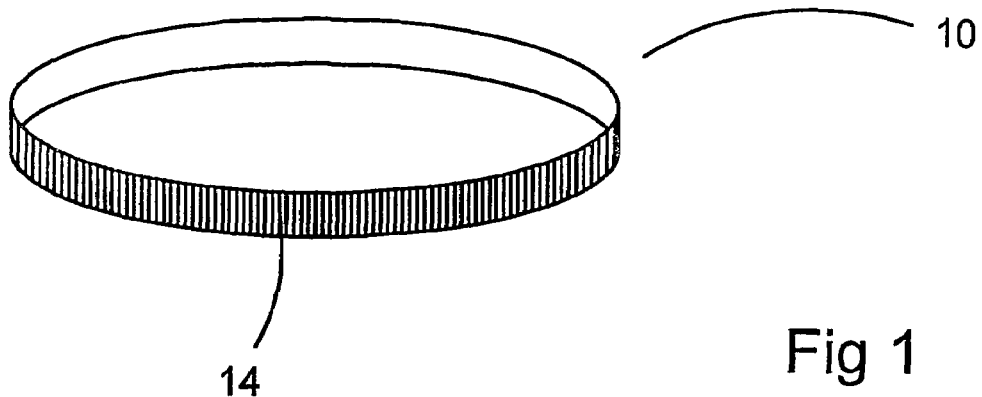
FIG. 1 is a perspective view of the ring of the present invention.
Figure 2:
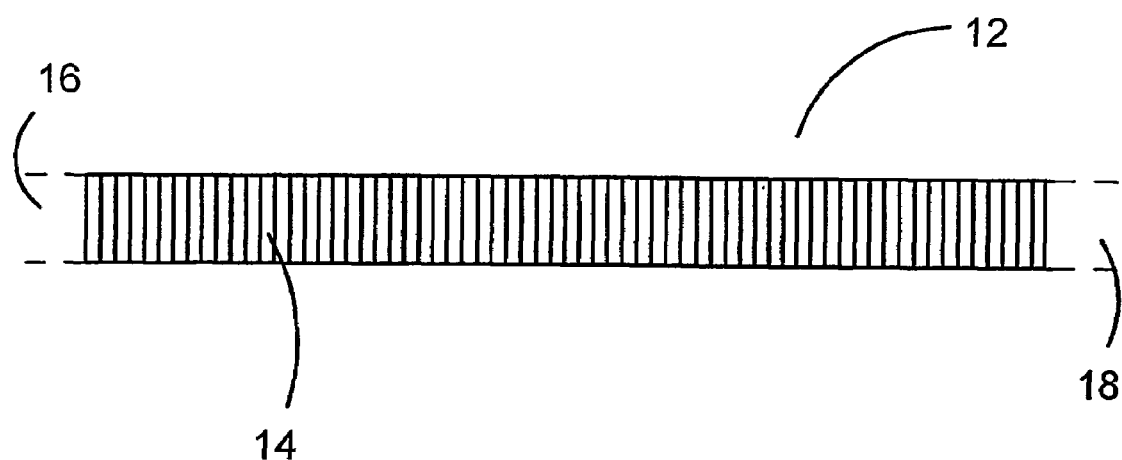
FIG. 2 is a plan view of a length of flexible scale use to make the ring of the present invention.

FIG. 1 illustrates a rotary ring of the present invention. A flexible ring 10 is provided with scale marks 14 defining a pattern along one surface. The scale marks may for example define a periodic pattern to form an incremental scale or define a pseudorandom sequence or discrete codewords to form an absolute position scale. The scale marks may be provided directly on a surface of the rotary ring or may be provided on a tape which is secured to a surface of the rotary ring. The ring 10 may be made from a length of linear scale formed from a length of flexible tape 12 as shown in FIG. 2. Such a linear scale is disclosed in our earlier patent U.S. Pat. No. 4,926,566 and may be made by subjecting a length of tape to an embossing process to form a profile comprising a sequence of troughs and crests. The embossing process may entail, for example, passing the scale between rollers, one of which has a profiled surface corresponding to the desired profile of the scale.

The rotary ring 10 is formed by bending the linear scale 12 into a ring and joining the two opposite ends 16,18 together by any suitable method, for example by welding. In particular, the ends of the tape may be butt welded or laser welded together.

Alternatively the scale marks may be put onto a flexible ring by any suitable technique, for example etching. The flexible ring may be formed by deposition or machining from a solid, for example.

FIG. 1 shows the ring 10 having the scale markings 14 on the outer circumferential surface. Alternatively the scale markings may be provided on the inner circumferential surface. In this case mounting the ring onto a machine part is inverted such that the outer circumferential surface of the ring is mounted on the machine part.

Figure 3:
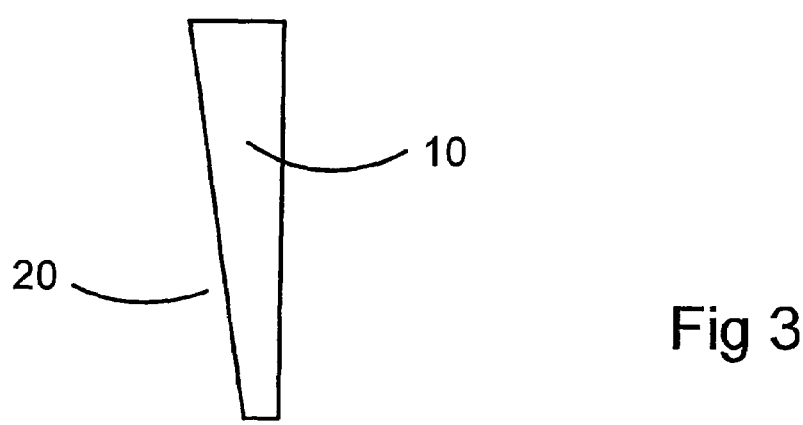
FIG. 3 is a cross-section of a length of tapered flexible scale.

The ring 10 shown in FIG. 1 may be provided with a tapered surface 20, as shown by the cross-section of the ring in FIG. 3.

This flexible ring has the advantage that it is smaller and lighter than solid rings.

A further advantage is that the flexible ring can fit within the desired application with the minimum of space or constraint on design. Use of the flexible ring has almost the same effect as putting the graduations directly on the prime components but with the advantage that the flexible ring may be replaced if damaged.

The ring is mounted on a rotary part of a machine and a readhead is mounted on a stationary part of the machine. Alternatively, the ring may be mounted on a stationary part of the machine and the readhead may be mounted on a rotary part of the machine. In previous types of rotary rings, mounting screws may be provided to fix the ring to the rotary part. This is not possible with the thin flexible ring and thus other means of fixing the ring onto the rotary part must be used. When the ring is mounted on the rotary part of the machine, it is desirable that the manufacturing tolerance of the ring is taken up.

Methods of mounting the flexible ring onto a rotary part of a machine will now be described with reference to FIGS. 4-9.

FIGS. 4-7 all illustrate the ring 10 fitted onto a rotary part 22 of a machine in which the rotary part has been provided with features to secure the ring in place.

Figure 4:
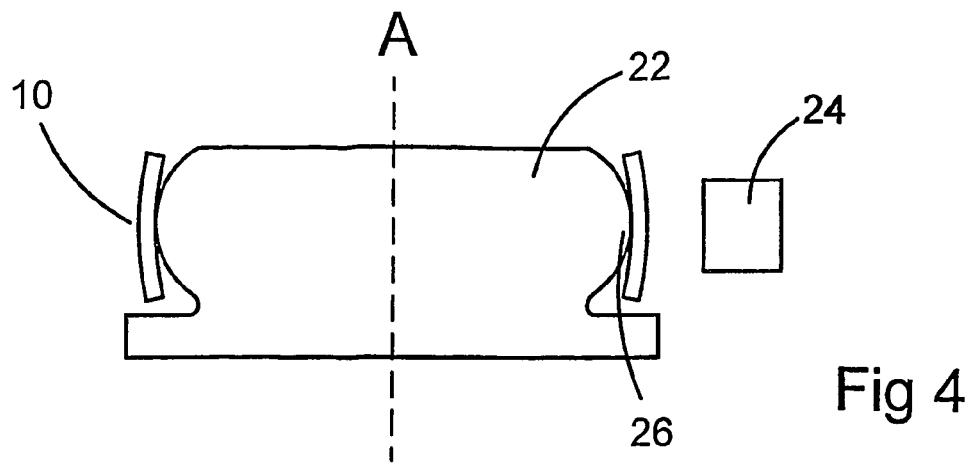
FIG. 4 is a cross-section of a ring mounted over an annular protrusion on a rotary part of a machine.

FIG. 4 illustrates a rotary part 22 with an annular protrusion 26. The ring 10 is pushed onto this protrusion 26 such that the protrusion is located at the centre of the scale, causing the scale to deflect around the protrusion, fixing it in place. Although the scale is deflected when in position, the readhead 24 is positioned to read the centre of the scale which is negligibly distorted.

Figure 5:
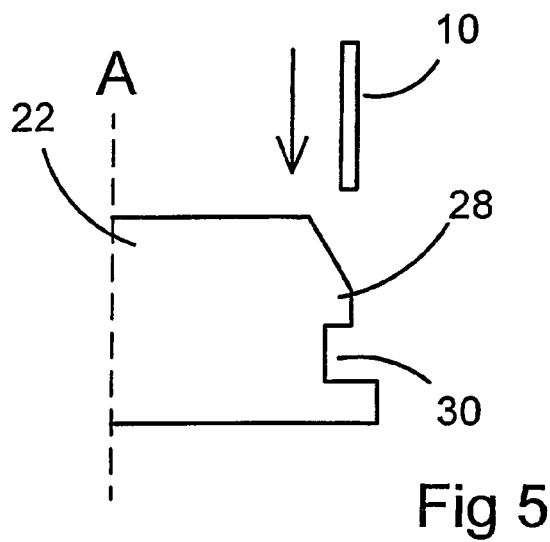
FIGS. 5 and 6 are cross-sections of a ring being mounted over a tapered protrusion on a rotary part of a machine.
Figure 6:
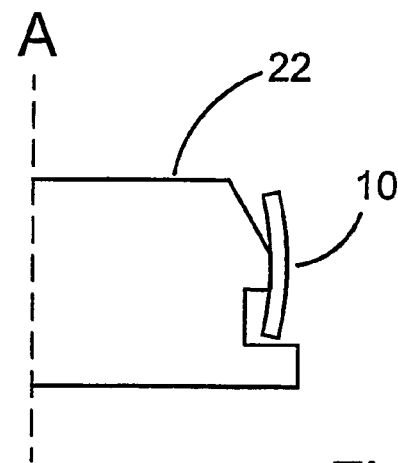

FIGS. 5 and 6 illustrates a different feature on the rotary part of the machine. In this embodiment the rotary part 22 is provided with a tapered surface 28 at the upper section of the rotary part 22 and a recessed portion 30 at the lower section of the rotary part. As shown in FIG. 5, the ring 10 is pushed onto the tapered surface 28, which stretches the ring, taking up the manufacturing tolerance. Once the bottom portion of the ring reaches the recess 30, the ring will be held in position, as shown in FIG. 6, deflected over the tapered surface 28, with one side deflected on the tapered surface 28, the other side deflected into the recess 30 and the central portion at the widest part of the taper. At the widest part of the scale, the taper may flatten out, to provide a flatter area for the centre of the ring to minimise distortions of the scale as read by the readhead.

Figure 7:
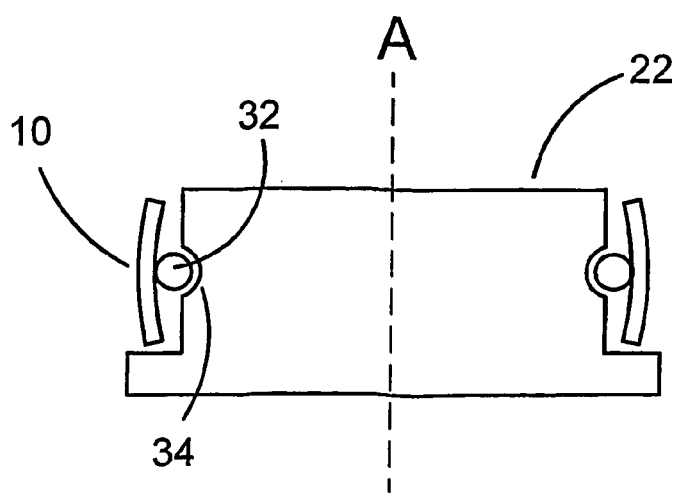
FIG. 7 is a cross-section of a ring mounted over an O-ring mounted on a rotary part of a machine.

The features of the rotary part are not necessarily integral with the rotary part. FIG. 7 illustrates an embodiment in which the feature is provided by an O-ring 32 fitted around the rotary part 22. The circumferential surface of the rotary part may be provided with a annular recess 34 in which to locate the O-ring 32. The ring 10 is pushed over the O-ring 32 in the same manner as in the other embodiments.

Figure 10:
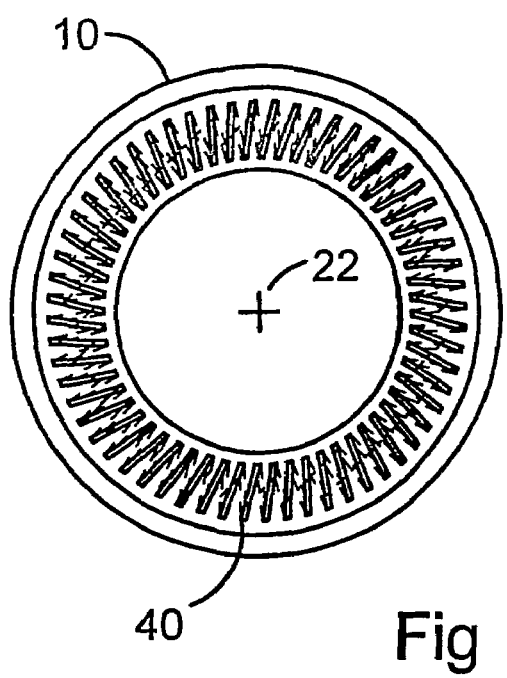
FIG. 10 is a plan view of a garter spring mounted between a flexible ring and machine shaft.
Figure 12:
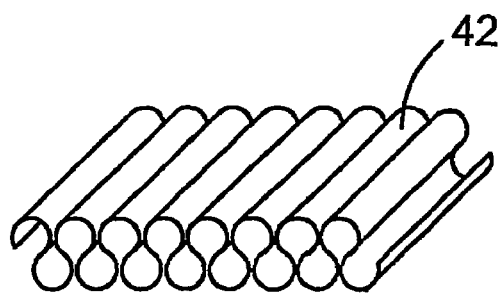
FIG. 12 is a perspective view of part of the corrugated spring illustrated in FIG. 11.
Figure 11:
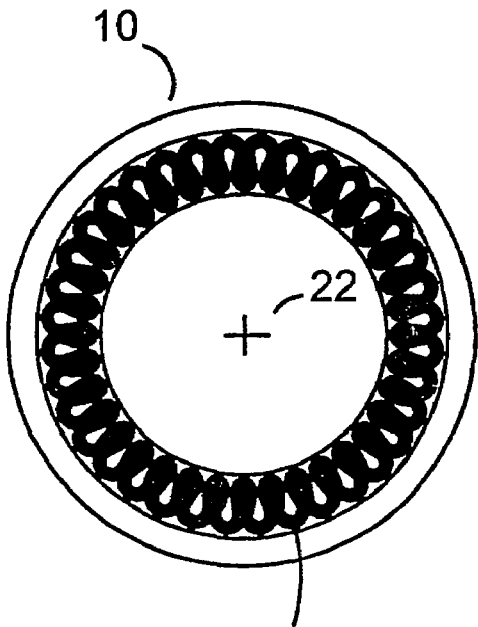
FIG. 11 is a plan view of a corrugated spring mounted between a flexible ring and a machine shaft.

The "o"-ring may include any ring-shaped flexible arrangement, for example a garter spring 40 as illustrated in FIG. 10 or a spring 42 having a corrugated cross-section as illustrated in FIG. 11 and shown in more detail in FIG. 12.

Figure 8:
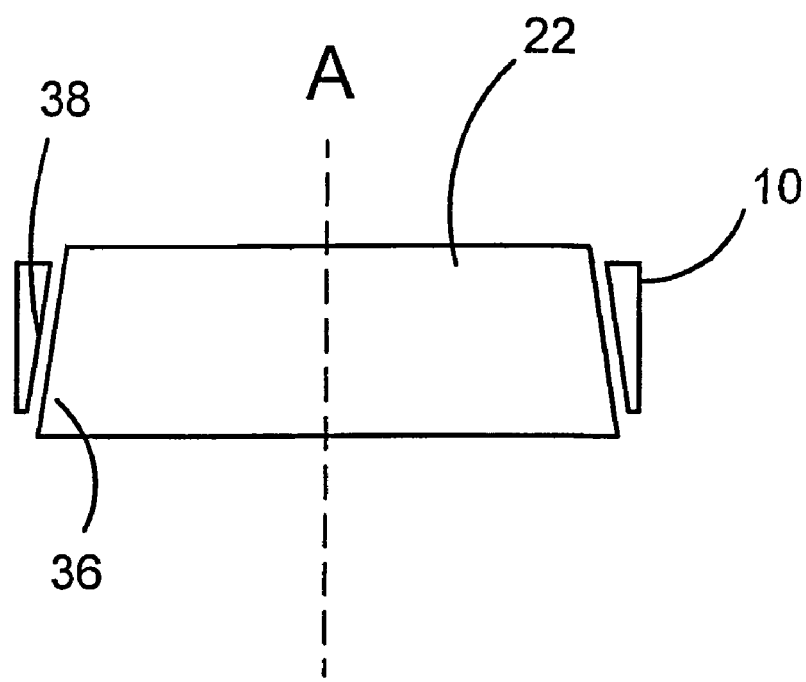
FIG. 8 is a cross-section of a tapered ring mounted on a tapered rotary part of a machine.
Figure 9:
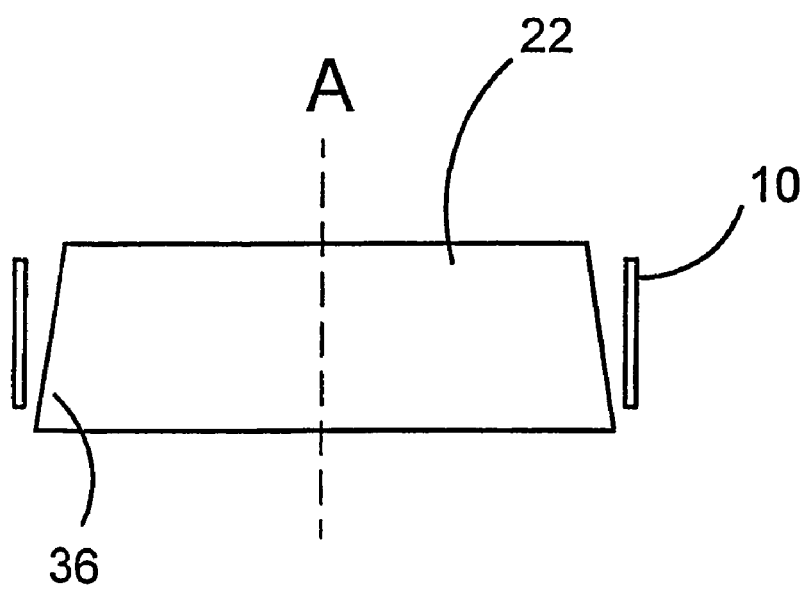
FIG. 9 is a cross-section of a ring mounted on a tapered rotary part of a machine.

FIGS. 8 and 9 illustrate a rotary part 22 of a machine provided with a tapered surface 36. In FIG. 8 the ring 10 also has a tapered surface 38, the tapered surface corresponding to that on the tapered rotary part. The tapered ring is pushed down over the tapered rotary part and as the diameter of the rotary part increases down the taper, the manufacturing tolerance of the ring is taken up. The taper angles of the tapered rotary part and ring are chosen such that the taper is a self-locking taper. In a locking taper, the angle of friction is less than the coefficient of friction and the frictional forces between the parts (i.e. the ring and rotary part) are so great that they will not rotate or move with respect to one another. Thus no other clamping forces are required to keep the parts joined together and a considerable force is required to separate the two parts.

In FIG. 9 a non-tapered ring 10 is pushed over the tapered rotary part 22. As the ring 10 is pushed over the tapered surface 36 of the rotary part 22, the ring 22 is stretched. As with the tapered ring, this ring is held in place by friction.

The ring of the present invention may also be fitted onto the rotary part by shrink fitting or use of adhesive.

Shrink fitting is suitable, for example, for any of the mounting techniques described with reference to FIGS. 4-9 or onto a machine shaft with parallel sides.

The above methods have the advantage that the ring may be quickly and easily fitted into place on the rotary ring without the need for mounting fixtures, such as screws. The process of stretching or shrinking the flexible scale into places ensures that the manufacturing tolerances of the scale are taken up.

If required, the ring may be adjusted axially to provide a fine radial run out correction, for example as disclosed in European Patent Application No. EP1094302.

This invention is not limited to use with optical scales. It is also suitable, for example, for use with magnetic scales.

The invention claimed is:

1. A rotary ring for use in a scale reading apparatus, comprising:
    a pre-formed continuous flexible ring having scale markings provided on a surface thereof, the flexible ring being sufficiently flexible to self-retain, without any attachment device, about a circular machine part solely by elastic deformation of at least one portion thereof.

2. A system for mounting a rotary ring for use in a scale reading apparatus onto a circular machine part, comprising the rotary ring of claim 1 and co-operating means on one or both of said circular machine part and said rotary ring, said co-operating means comprising a region of increased diameter.

3. A system according to claim 2, wherein the cooperating means is located on the circular machine part, and wherein the region of increased diameter is integral with the circular machine part.

4. A system according to claim 2, wherein the cooperating means is located on the circular machine part, and wherein the region of increased diameter is not integral with the circular machine part.

5. A system according to claim 4, wherein the region of increased diameter comprises a ring-shaped flexible member.

6. A system according to claim 2, wherein the region of increased diameter comprises an annular protrusion.

7. A system according to claim 2, wherein the region of increased diameter comprises a tapered surface.

8. A system according to claim 2, wherein the flexible ring is provided with a tapered surface.

9. A system according to claim 2, wherein at least one of the region of increased diameter and the rotary ring is provided with a tapered surface and forms a self locking taper.

10. A system according to claim 2, wherein the region of increased diameter is shaped so that when the flexible ring is fitted over said region of increased diameter, a central region of said rotary ring is substantially parallel with the axis of said circular machine part.

11. A method of mounting a flexible rotary scale, in the form of a pre-formed continuous ring, onto a circular machine part, the method comprising:

stretching or shrinking the flexible rotary scale onto the circular machine part such that the ring is retained without any attachment device.

12. A method of mounting a flexible rotary scale onto a circular machine part according to claim 11, wherein the circular machine part has a region of increased diameter and the method includes the step of stretching or shrinking the flexible rotary scale over the region of increased diameter.

13. A method of mounting a flexible rotary scale onto a circular machine part according to claim 11, wherein the region of increased diameter is integral with the circular machine part.

14. A method of mounting a flexible rotary scale onto a circular machine part according to claim 11, wherein the region of increased diameter is not integral with the circular machine part.

15. A method of mounting a flexible rotary scale onto a circular machine part according to claim 14, wherein the region of increased diameter comprises a ring-shaped member.

16. A method of mounting a flexible rotary scale onto a circular machine part according to claim 11, wherein the region of increased diameter comprises an annular protrusion.

17. A method of mounting a flexible rotary scale onto a circular machine part according to claim 11, wherein the region of increased diameter comprises a tapered surface.

18. A method of mounting a flexible rotary scale onto a circular machine part according to claim 11, wherein the flexible rotary scale is provided with a tapered surface.

19. A method of mounting a flexible rotary scale onto a circular machine part according to claim 11, wherein at least one of the region of increased diameter and the flexible rotary scale is provided with a tapered surface that forms a self locking taper.

20. A method of mounting a flexible rotary scale onto a circular machine part according to claim 11, wherein the region of increased diameter is shaped so that when the flexible rotary scale is fitted over the region of increased diameter, a central region of the flexible rotary scale is substantially parallel with the axis of the circular machine part.

21. A system for mounting a continuous flexible rotary ring for use in a scale reading apparatus onto a circular machine part, comprising a pre-formed continuous flexible rotary ring having scale markings provided on a surface thereof, wherein a tapered surface is provided on one or both of said circular machine part and said flexible rotary ring, and the taper angle of said tapered surface is sufficient to form a self locking taper, without any attachment device.

* * * * *